United States Patent [19]
Beynon et al.

[11] 3,922,646
[45] Nov. 25, 1975

[54] REPERTORY DIALLER WITH VARIABLE LENGTH CIRCULATING STORE

[75] Inventors: John David Emrys Beynon; Alan Francis Newell; Robert John Maddock, all of Southampton; Robert Andrew Stevenson, Newton Aycliffe, England

[73] Assignee: The General Electric Company Limited, London, England

[22] Filed: Mar. 27, 1974

[21] Appl. No.: 455,342

[30] Foreign Application Priority Data

Mar. 29, 1973 United Kingdom .............. 15121/73

[52] U.S. Cl. ........ 340/173 RC; 179/90 B; 179/90 K
[51] Int. Cl.² .................. G11C 19/00; G11C 21/00
[58] Field of Search ..... 179/90 B, 90 K; 307/221 R; 340/173 RC

[56] References Cited

UNITED STATES PATENTS

| | | | |
|---|---|---|---|
| 2,961,535 | 11/1960 | Lanning | 340/173 RC |
| 3,601,552 | 8/1971 | Ware et al. | 179/90 B |
| 3,691,536 | 9/1972 | Peterson | 340/173 RC |
| 3,733,471 | 5/1973 | Gilberg | 340/173 RC |

*Primary Examiner*—Stuart N. Hecker
*Attorney, Agent, or Firm*—Kirschstein, Kirschstein, Ottinger & Frank

[57] ABSTRACT

A repertory dialler has a circulating dynamic store for the storage of the information required for impulsing to line upon operation of a selected call push-button. The push-buttons are each associated with an individual data word in the store and all the data words normally circulate round the store as a single block of data without any gaps between words. There is provision for new data words to be inserted and for existing data words to be erased. Upon erasure of a word that produces a gap in the circulating data block, that gap is reduced by temporarily varying the effective length of the loop of the circulating store during each of a succession of passes of the data block until the gap is closed up.

9 Claims, 6 Drawing Figures

REPERTORY DIALLER WITH VARIABLE LENGTH CIRCULATING STORE

Figure 1:
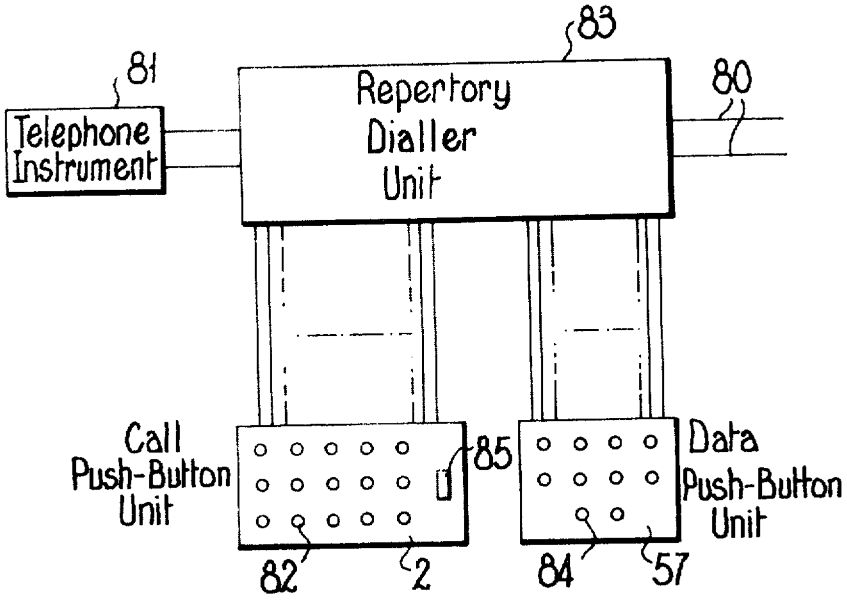

This invention relates to digital storage systems. More particularly it is concerned with systems of the kind in which digital data is stored by being caused to pass repeatedly round a circulation loop.

A digital storage system of the kind just specified may conveniently comprise a shift register and a feedback path connected between the output and input ends of the shift register. With such a system, digital data stored in the shift register is advanced in that register and thereby caused to circulate by means of clock pulses supplied to the register.

In some applications of digital storage systems of this kind, it is convenient for stored data in the form of a plurality of words each having a plurality of binary digits to circulate as a single block in which there are no gaps between successive words. Thus as the stored data passes any particular point in the circulation loop, the only gap that occurs is between the end of the block on one pass round the loop and the beginning of the block on the succeeding pass, the length of this gap depending on the amount of data stored. If then an additional word is to be stored, this may be done by injecting the appropriate data into the loop at a time determined by the end of the block so as effectively to extend the length of the block. Similarly a stored word may be erased by temporarily interrupting the feedback path as that data is due to be fed back to the input end of the shift register. However, unless the erased word is at the beginning or the end of the circulating block, this would leave a gap in the middle of the block which would present difficulty when another word is to be stored, particularly if the storage system is required to store words of different length (i.e., having different numbers of digits).

One object of the present invention is to provide a digital storage system which overcomes the difficulty discussed above.

According to the present invention, in a digital storage system of the kind which is adapted to store data in the form of a plurality of digital words of variable length by causing that data normally to pass repeatedly round a circulation loop as a single block without any gap between words, there is provision for data words to be added to and erased from the circulating data and circuitry which is operable upon a data word being erased leaving a gap in said block of data to cause a temporary predetermined variation in the effective length of the loop for a period less than that in which said block of data passes round the loop so as to close up the gap on each pass of the block of data round the loop.

Preferably said predetermined variation in the effective length of the loop corresponds to the storage capacity for a plurality of digits that is small compared with the number of digits in a word. Thus, if a particular word consists of forty binary digits and the effective length variation corresponds to four digits, it would be necessary for the block of data to circulate ten times for the gap produced by erasure of that word to disappear.

The operation of closing up the gap may be brought about by temporarily extending the loop at a particular point as the end of the data block passes that point and then returning the loop to its normal length when the gap (or part thereof) is stored by the extension.

According to a feature of the present invention, a digital storage system comprises shift register means, a feedback path connected between the output and input ends of the shift register means to form a circulating data store which is adapted to store a plurality of data words which normally circulated in the store as a single block of data without gap between words, circuit means to add a data word of variable length to the end of the data block circulating in the store by injecting suitably timed signals into said feedback path, circuit means to erase a data word circulating in the store by interrupting said feedback path for the period during which that data word would otherwise pass through the feedback path, and circuit means operable upon an erased word not being at the beginning or end of the data block to close up the gap resulting from such cancellation, the latter means comprising a further shift register means which is arranged to operate synchronously with the previously-mentioned shift register means and which is arranged selectively to be brought into circuit in the feedback path so as to enable a temporary variation in the storage capacity of the store for a period less than that in which said block of data passes round the store so as to reduce the gap on each such pass.

Preferably the feedback path normally by-passes the further shift register means which is only brought into operation when a gap in the data block is to be closed up.

A digital storage system in accordance with the present invention may conveniently be incorporated in apparatus which is for use with a telephone system and which is arranged, in response to manual operation of a selected push-button, key or other switch, to supply electric signals that are characteristic of the exchange and/or directory number of any selected one of a plurality of other subscribers or parties connected to the telephone system. The signals are of the kind utilised by the telephone system to set up a required speech connection through the system. Such apparatus is sometimes known as a 'repertory dialler' by which term it is subsequently referred to herein although it is to be understood that the electric signals supplied thereby need not be in the form of trains of impulses (simulating those provided by a conventional telephone dial unit) but may take other forms, for example audio tones.

When a digital storage system in accordance with the present invention is incorporated in a repertory dialler, each of said data words is uniquely associated with one subscriber or party to be called and preferably comprises a digital address followed by digits that are characteristic of the exchange and/or directory number of the associated subscriber or party.

One example of a repertory dialler in accordance with the invention will now be described with reference to the accompanying drawings in which:

FIG. 1 shows the complete repertory dialler in diagrammatic form, and

Figure 6:
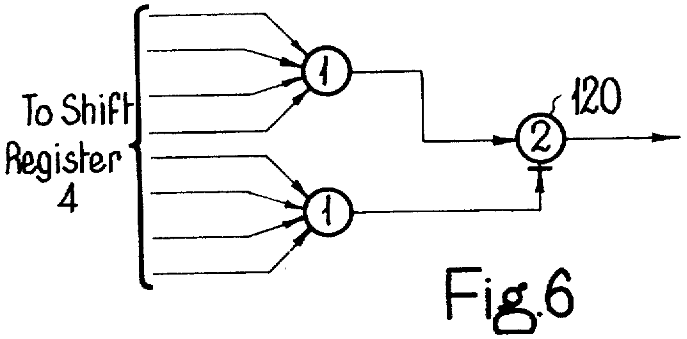
Figure 2:
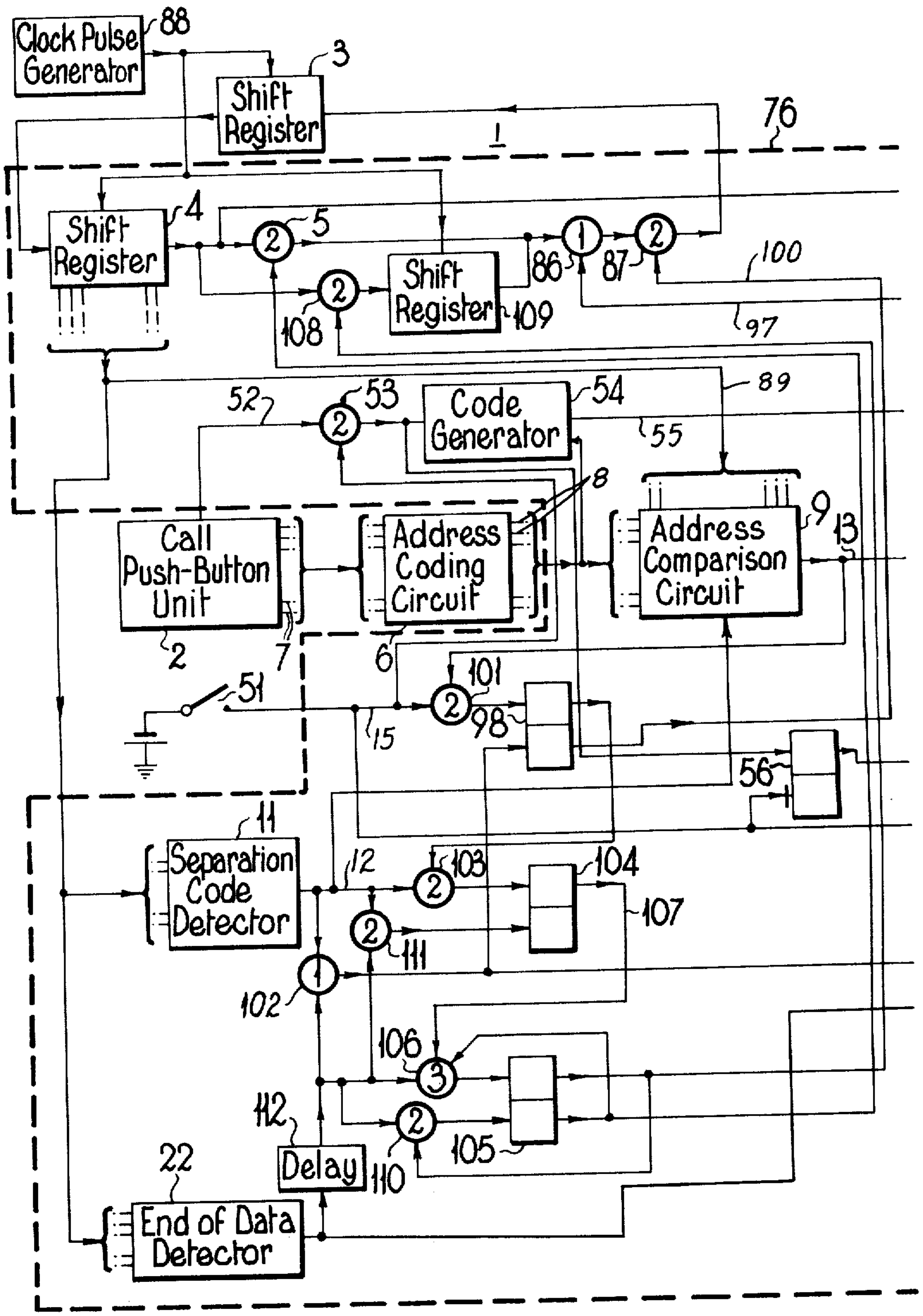
Figure 3:
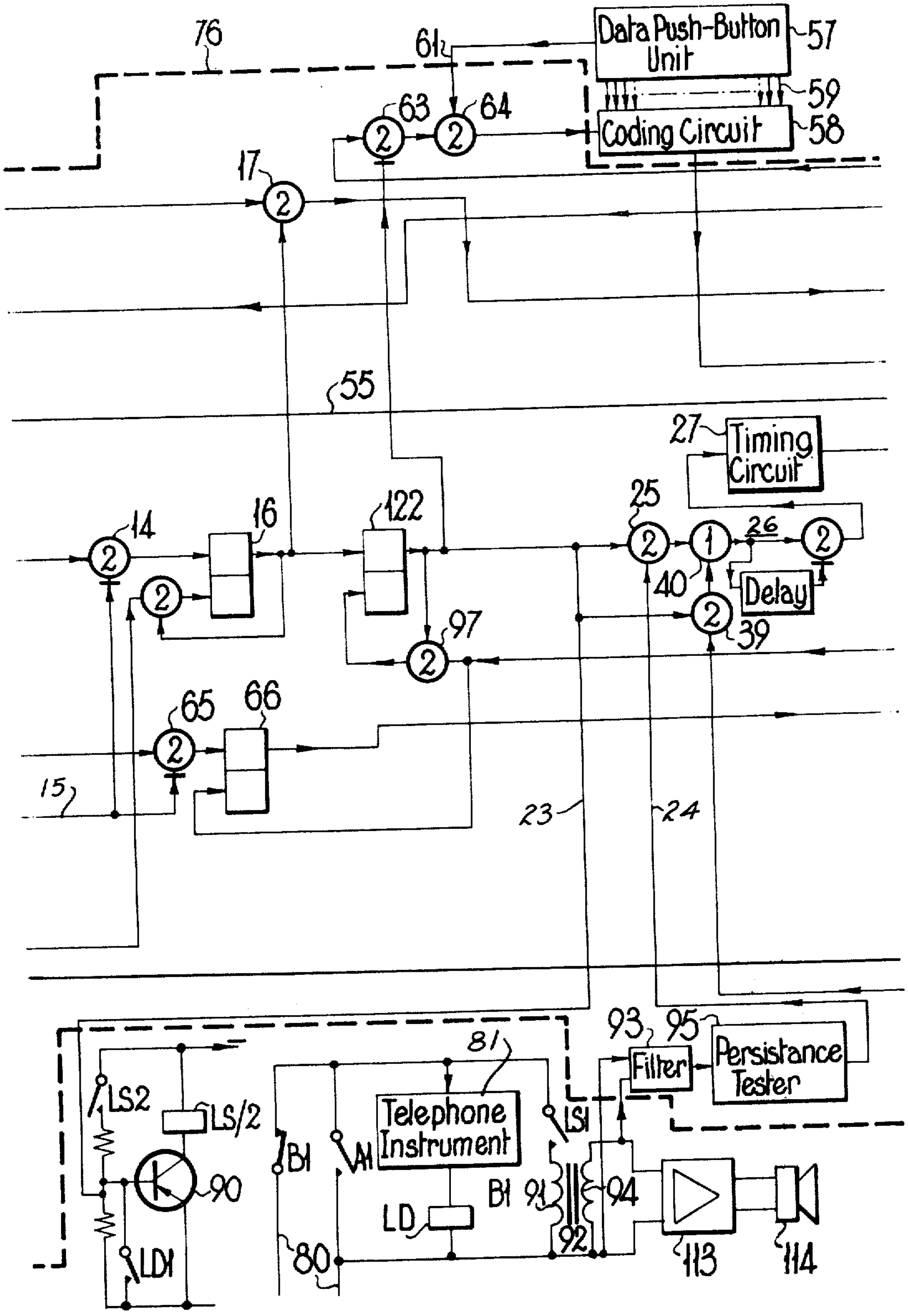
Figure 4:
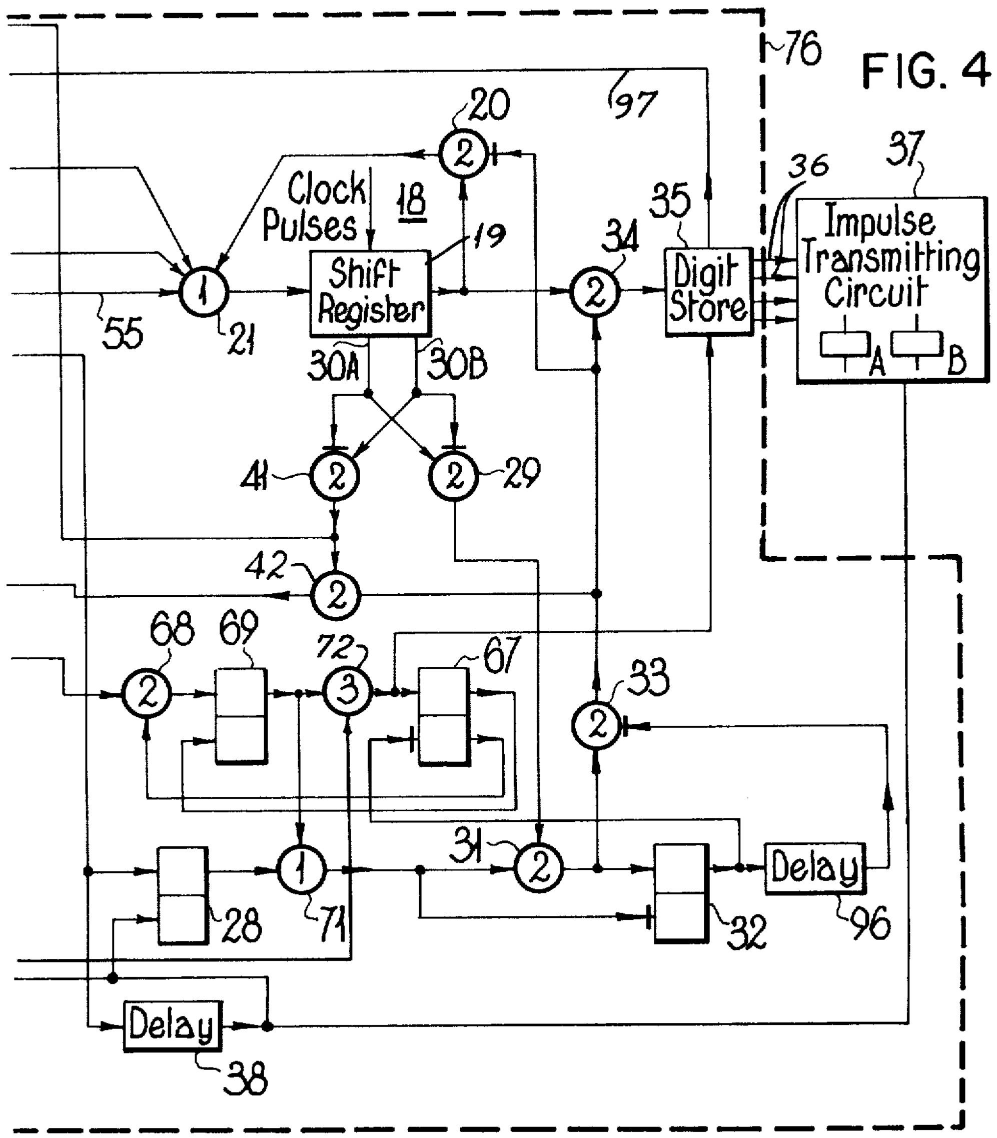
Figure 5:
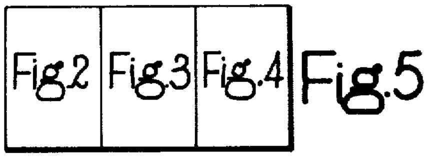

FIGS. 2 to 4, when arranged as set out in FIG. 5, show the circuit of the repertory dialler in more detail, and FIG. 6 shows the circuit of an item of the dialler.

Referring first to FIG. 1, the repertory dialler is arranged to enable a speech connection to be set up over line wires 80 (connected to a public telephone system) between a telephone instrument 81 and any one of a predetermined plurality of other subscribers connected to the telephone system merely by pressing the appropriate push button 82 of a unit 2.

The necessary 'dialling' information for each of these subscribers (i.e., the exchange and/or directory number) is stored by electronic equipment, shown in this figure as the unit 83, and that unit is arranged to supply to the line wires 80 the appropriate trains of impulses or other signals characterising the subscriber to be called when a pushbutton 82 is pressed.

There is also provision for writing new 'dialling' information into the unit 83 in respect of any particular one of the pushbuttons 82 by means of a unit 57 (which may form part of the telephone instrument 81) having ten pushbuttons 84 which are numbered with the ten decimal digits respectively. To effect such writing, a manually-operable key-switch 85 on the unit 2 is operated prior to the appropriate pushbutton 82 being pressed and successive operation of a plurality of the pushbuttons 84 to identify the exchange and/or directory number of the subscriber in question results in that information being stored when the key-switch 85 is returned to its normal position.

Considering now the circuitry of the repertory dialler in more detail with particular reference to FIGS. 2 to 4, a data store 1 is arranged to store the information to be 'dialled out' in binary form. The data store 1 comprises a multi-digit shift register 3 and a feedback path which is connected between the output and input sides of the register 3 and which contains a much smaller shift register 4 and gates 5, 86 and 87. Under normal conditions, enabling signals are supplied to gates 5 and 87 over leads 99 and 100 respectively while a generator 88 feeds clock pulses to the shift registers 3 and 4 so that they operate synchronously. It follows therefore that, during use, any data entered into the store 1 continues to circulate.

The data stored by the store 1 consists of a plurality of groups of binary digits each of which groups is associated with one of the pushbuttons 82 (FIG. 1) and is subsequently referred to herein as a 'word'. Each stored word consists of a plurality of sub-words each of four binary digits. The first sub-word of each word is a characteristic combination of binary digits which are chosen so as not to occur in any other sub-word and which is subsequently referred to as the 'separation code'. The next two sub-words constitute a unique address of that word and the remaining sub-words represent the information to be dialled out when the appropriate pu-h-button 82 of the unit 2 is pressed. In fact, each of the latter sub-words represents one decimal digit of the subscriber's exchange code or directory number in binary coded form.

The data word stored by the store 1 at any time immediately follow one another as they pass round the loop formed by the register 3 and said feedback path. Thus the data words constitute a circulating block of data in which there are no binary digit gaps between adjacent words.

DIALLING OUT

When the repertory dialler is used to set up a call, the appropriate pushbutton 82 of the call unit 2 is pressed as aforesaid. This causes signals to be applied to an address coding circuit 6 over a group of leads 7 so as to identify the pushbutton that had been pressed. (In one arrangement, the leads 7 are arranged in two sub-groups and each pushbutton of the unit 2 is arranged when pressed to connect together a unique combination of one lead in each of the two sub-groups. In this case, the address coding circuit 6 operates at high speed to supply signals sequentially to the leads of the first group and to scan the leads of the second group. Thus the lead of the second group over which a signal is received back and the time of occurrence of that signal characterise a pushbutton that has been pressed.) The coding circuit 6 is arranged to supply signals in parallel to a group of leads 8 to identify in binary coded form the pushbutton of the unit 2 that has been pressed. The signals supplied by the coding circuit 6 are passed to an address comparison circuit 9 to which are also passed signals in respect of the data circulating in the store 1.

The shift register 4 is provided so that the binary data in the store 1 may be monitored as it is circulating. In particular signals characterising eight adjacent digits passing through the register 4 are supplied in parallel by the register 4 to the comparison circuit 9 over a group of eight leads which are represented in the drawings by a line 89. Furthermore a code detector 11 is arranged to inspect the circulating data in similar manner and to supply a signal over a lead 12 whenever the separation code is passing through the register 4. This signal is also passed to the comparison circuit 9 to initiate operation thereof. When that circuit recognises the address supplied by the coding circuit 6 in the data circulating in the store 1 immediately following a separation code, a signal is supplied over a lead 13. This signal is passed through a gate 14, there being no signal at this time on the lead 15, and is utilised to set a bistable circuit 16.

The pulse signal supplied by the shift register 4 and representing the data circulating in the store 1 is passed to a coincidence gate 17. When the bistable circuit 16 is set, an enabling signal is passed to the gate 17 to permit the data signal supplied to that gate to be passed to a buffer binary data store 18 which is also a circulating store. The store 18 in fact comprises a multi-digit shift register 19 and a feedback path including gates 20 and 21 connected between the output and input sides of the register 19. At the end of the data word being read from the store 1, the bistable circuit 16 is reset either by the next signal supplied by the separation code detector 11 or, if the word in question is at the end of the circulating data block, by a signal supplied by a detector 22 which is arranged to inspect the data passing through the shift register 4 and to supply a signal at the end of the data block. The shift register 19 is arranged to operate synchronously with the shift registers 3 and 4, clock pulses being supplied to the register 19 for this purpose by the generator 88, and the arrangement is such that the appropriate data word circulating in the store 1 less its separation code and address code is caused to circulate in the store 18.

It will be appreciated that this operation of writing data into the store 18, which incidentally is of much smaller storage capacity than the store 1, does not affect the data circulating in the store 1.

Setting the bistable circuit 16 as aforesaid causes another bistable circuit 122 to be set. This in turn results in a signal being supplied over a lead 23 to cause a transistor 90 to conduct and thereby operate a relay LS. Closure of contacts LS1 loop the line wires 80 by way of normally closed relay contacts B1 and the primary winding 91 of a transformer 92. A signal is thus sent in known manner to the remote exchange that a calling condition exists.

A dial tone filter 93 is connected across the secondary winding of the transformer 92. Upon receipt of dial tone from the exchange, a signal is passed by the filter 93 and, when that tone is received for at least a predetermined period as determined by a persistance circuit 95, a signal is supplied over a lead 24.

Coincidence of the signal on the lead 24 and the bistable circuit 122 being set is detected by a gate 25 so that a signal is passed via a gate 40 to a pulse forming circuit 26. The pulse supplied by the circuit 26 is fed to a timing circuit 27 which effectively introduces a delay of approximately 500 milliseconds. (The timing circuit 27 may conveniently be a digital counting circuit responsive to clock pulses supplied by the generator 88, the supply of such pulses being interrupted when a count is registered corresponding to the period to be timed.) The signal supplied by the timing circuit 27 is utilised to set a bistable circuit 28 to signify that a sub-word is ready to be transferred from the buffer store 18. The sub-word in question is in fact the first one of the block of data then circulating in the store 18 and it is accordingly necessary to wait until that data is appropriately located in the store 18.

Signals are respectively supplied over leads 30A and 30B when there is any data in the last two sub-word locations of the register 19. These two leads are connected to a gate 29 which is arranged to supply a signal as the first digit of the data block in the store 18 emerges from the shift register 19. Coincidence of this signal and the fact that the bistable circuit 28 is set is detected by a gate 31 and the resulting signal is used to set another bistable circuit 32. A gate 33 supplies a pulse at this time, this pulse having a timing and duration such that it coincides with the four binary digits of the sub-word to be transferred from the store 18 as that sub-word appears at the output of the shift register 19. (The duration of the signal supplied by the gate 33 is determined by a delay element 96 which passes an inhibiting signal to the gate 33 a predetermined time after the circuit 32 has been set.) The pulse signal supplied by the gate 33 is in fact passed to a gate 34 to enable a word in question to be read into an auxiliary store 35 and as an inhibiting signal to the gate 20 to erase that word from the store 18. (The store 35 may conveniently comprise four bistable circuits which are arranged to store the four digits of the sub-word respectively.)

The store 35 is arranged to supply signals representing the four digits of the stored sub-word in parallel over leads 36 to an impulse transmitting circuit 37. The signal supplied by the timing circuit 27 as aforesaid is utilised, after a short delay introduced by the delay element 38, as a strobe signal to cause the circuit 37 to respond to the signal supplied thereto over the leads 36. This strobe signal is also used to reset the bistable circuit 28 (which in turn, causes the bistable circuit 32 to reset) and is fed back to the pulse forming circuit 26 by way of the gate 39 (which has a signal supplied to its other input at this time by the circuit 22) and gate 40 so as to repeat the above sequence for transferring the next data sub-word then stored in the store 18 to the circuit 37. This sequence is in fact repeated until the buffer store 18 is empty.

A gate 41 is connected to the leads 30A and 30B and is arranged to supply a signal when the end of the circulating data block in the store 18 is detected. If this condition is detected while a transfer pulse is being supplied by the gate 33, it follows that there is no more data in the store 18 to be transferred. Accordingly a signal is then supplied by a gate 42 via a gate 97 to reset the bistable circuit 122. This in turn removes the enabling signal from the gate 39 so that the transfer operation is terminated.

The impulse transmitting circuit 37 is arranged to store the sub-words (each representing one decimal digit of the information to be 'dialled out') that are transferred thereto from the store 18 by way of the store 35. For each of these decimal digits, the circuit 37 first operates relay A so as to close contacts A1 and then generates a conventional train of 'dialling' impulses by operation of relay B to open contacts B1. Successive trains of impulses are supplied to the line wires 80 with appropriate interdigit pauses. The circuit 37 may be substantially as described in U.S. Pat. No. 3,601,552.

When the called subscriber or party answers, the returned speech signal is passed through the transformer 92 and an amplifier 113 to a loudspeaker 114. The caller then lifts the handset (not shown) of the conventional telephone instrument 81 thereby completing an operating circuit for relay LD. Closure of contacts LD1 cause the transistor 90 to revert to its non-conducting state and thereby release relay LS. This breaks the line hold circuit through the contacts LS1 so that the call may subsequently be released in the normal manner when the handset of the instrument 81 is returned to its cradle.

Instead of generating trains of impulses, the circuit 37 may alternatively be arranged to signal each decimal digit as a pair of audio frequency tones the frequencies of which characterise the decimal digit value.

RECORDING

When it is required to write into the store 1 data associated with a pushbutton 82 of the call unit 2 that had not previously had an associated word in the store, the record key 85 (FIG. 1) is moved to its off normal position as aforesaid. Such operation of the record key causes contacts 51 to close. The appropriate pushbutton of the unit 2 is then pressed but the 'dialling out' operation described above is not initiated since an inhibiting signal is now supplied to the date 14 over the lead 15 as a result of the contacts 51 being closed. Such operation of any pushbutton of the unit 2 causes a signal to be supplied over a lead 52 and accordingly a signal is then passed by a gate 53 to a code generator 54.

The code generator 54 is arranged to supply over a lead 55 a signal carrying in serial form first the separation code (which is generated by the generator 54) and the address code of the appropriate pushbutton as supplied by the address coding circuit 6. (Apart from generation of the separation code, the generator 54 merely converts the pushbutton address from parallel to serial form.) This signal is passed to the gate 21 of the buffer store 18 (which is otherwise empty at this time) so that the separation code and the push-button address code are then caused to circulate as a block in the store 18.

The signal supplied by the gate 53 also causes another bistable circuit 56 to be set.

If now the operations described in the last three paragraphs had been as a result of pressing a call push-button 82 of the unit 2 that had previously had an associated word stored in the store 1, it is necessary for that word to be erased. As will now be described, this is done automatically and the resulting gap (if any) in the circulating data block closed up before the new word is added to the end of that block.

A bistable circuit 98 is normally in the state to supply a signal to the gate 87 over lead 100. A gate 101 however supplies a signal to trigger the circuit 98 to its off-normal state when the contacts 51 are closed (signifying that the repertory dialler is operating in its recording mode) and a signal is supplied by the address comparison circuit 9 (signifying that there is a word already in the store 1 having the address associated with the call push-button 82 of the unit 2 that has been pressed). The signal on the lead 100 is thus removed just as the word in question is due to be passed to the gate 87 with the result that the word is erased from the store 1. At the end of that word, the bistable circuit 98 is reset via a gate 102 by a signal supplied either by the separation code detector 11 (if the erased word was within the data block) or by the end of data detector 22 (if the erased word was at the end of the data block). In either case, the circulating data other than the erased word is unaffected.

If the bistable circuit 98 is restored to its normal condition by a signal supplied by the separation code detector 11. The existence of that signal while the circuit 98 is still off-normal causes a signal to be passed by a coincidence gate 103 to trigger another bistable circuit 104 to a state which signifies that there is a gap in the data block circulating in the store 1 that requires to be closed up.

Under normal operating conditions, an enabling signal is supplied to the gate 5 in the store 1 by a further bistable circuit 105. When the end of the data block circulating in the store 1 reaches the shift register 4, a signal is supplied by the detector 22 and coincidence of this signal with the signal supplied over lead 107 when the bistable circuit 104 is off-normal is determined by a gate 106 which supplies a signal to trigger the bistable circuit 105 to its off-normal state. This has the effect of removing the enabling signal from the gate 5 and supplying a signal to a coincidence gate 108. Thus the circulating data in the store 1 instead of passing through the gate 5 as hitherto now pass through the gate 108 and another shift register 109. The shift register 109 is arranged to operate synchronously with the registers 3 and 4 but only has a capacity of four binary digits. It will be appreciated therefore that at this time the length of the circulation loop of the store 1 is increased by four binary digits.

When the gap in the data block reaches the shift register 4, a signal is again supplied by the end of data detector 22 (which cannot, of course, distinguish between the true end of the block and the end of data preceding the gap) and the occurrence of this signal when the bistable circuit 105 is off-normal is determined by a coincidence gate 110 which then supplies a signal to reset the circuit 105. This returns the store 1 to its non-extended length and occurs at a time such that the first four digit spaces of the gap are in the register 109 so that, as far as the circulating data is concerned, the gap is closed up by that amount.

The sequence described in the last two paragraphs is repeated on successive passes of the data block through the feedback path of the store 1 until the gap in the data block is completely closed up. When there is only a four digit gap left, a coincidence gate 111 detects the simultaneous occurrence of a signal supplied by the separation code detector 11 and a signal (suitably delayed by a delay element 112) supplied by the end of data detector 22. Upon this occurring, the gate 111 supplies a signal to reset the bistable circuit 104 so that the enabling signal supplied thereby to the gate 106 is then removed.

A coding circuit 58 is connected to the push-button unit 57 (FIG. 1) by way of leads 59, the circuit 58 deriving a four digit binary representation that is characteristic of any pushbutton 84 of the unit 57 that is pressed. Furthermore, upon any pushbutton 82 of the unit 57 being pressed a signal is supplied over a lead 61.

It is required that the binary representation of any pushbutton of the unit 57 that is pressed after operation of the record key 85 shall be added to the end of the block of data circulating in the buffer store 18. As previously mentioned, the gate 41 supplies a signal when the end of data is detected in the shift register 19. This signal is passed through gates 63 and 64, the latter gate having an enabling signal supplied thereto at this time over lead 61, to the coding circuit 58 which is then arranged to supply a signal to the gate 21 of the buffer store 18, this signal consisting of the binary coded representation of the push-button of the unit 57 that has been pressed in serial form. (Clock pulses supplied by the generator 88 may be passed to the coding circuit 58 to ensure correct timing of the signal supplied thereby.) In other words the sub-word representing the pressed pushbutton 84 is added to the data circulating in the buffer store 18.

The sequence of operations described in the last paragraph is repeated as the succession of push-buttons 84 of the unit 57 are pressed and, when all the required information is stored by the buffer store 18, the record key 85 is returned to its normal position so as to open the contacts 51.

Upon the record key 85 being released, the repertory dialler operates to transfer the data stored by the buffer store 18 to the main store 1 one sub-word at a time. To this end, each sub-word stored by the store 18, starting with the first, is first transferred to the digit store 35 and then added to the end of the data block circulating in the store 1. The manner in which this is achieved will now be described.

Upon the contacts 51 opening, an enabling signal is supplied to a gate 65 to which a signal is already being supplied as a result of a bistable circuit 56 having been set as aforesaid. The signal passed by the gate 65 is utilised to set another bistable circuit 66 to signify that the data in the buffer store 18 is to be transferred to the main store 1. At the same the bistable 56 is reset.

At this time a bistable circuit 67 is in its reset state so that upon the circuit 66 being set a signal is passed through a gate 68 to set another bistable circuit 69. This in turn causes a signal to be passed through a gate 71 to the gate 31. Thus when a signal is supplied by the gate 29 at the beginning of the data block circulating in the buffer store 18, the gate 31 supplies a signal to set the bistable circuit 32 with the result that the first sub-word stored in the store 18 is transferred to the auxiliary store 35 as aforesaid. When now the detector 22 supplies a signal signifying that the end of the data block circulating in the main store 1 is passing out of the shift register 4, the coincidence of this signal and the signal supplied as a result of the bistable circuit 69 having been set, is detected by a coincidence gate 72 which supplies a signal to the store 35 so as to cause a signal representing the sub-word stored thereby in serial form to be supplied over a lead 97 to the gate 86 in the feedback path of the store 1. In this way the sub-word stored by the store 35 is added to the end of the data block circulating in the main store 1.

The signal supplied by the gate 72 is also utilised to set the bistable circuit 67 which in turn resets the circuits 69 and 32.

It will be appreciated that while the bistable circuit 32 was set, the inhibiting signal supplied thereby to the gate 33 via the delay element 96 prevented end of data signal supplied by the detector 29 from causing the transfer of further sub-words from the buffer store 18 to the auxiliary store 35. However, upon the bistable 32 being reset, the bistable circuit 67 is reset so as again to supply an enabling signal to the gate 68 with the result that the bistable circuit 69 is again set. This initiates a sequence for the next sub-word stored in the buffer store 18 to be transferred to the main store 1 and this is continued until the store 18 is empty. When the last sub-word is about to be transferred from the store 18, a signal is supplied by the gate 42 as aforesaid and this signal is utilised to reset the bistable circuit 66 thereby preventing further transfer action.

GENERAL

The shift register 3 is required to store many hundreds of binary digits. In one practical embodiment of the repertory dialler described it has been convenient to replace this signal shift register by two commercially available shift registers which are of integrated circuit form and which are connected in tandem so that the circulating digits pass through the two shift registers in turn. That part of the repertory dialler shown in the accompanying drawings within the broken outline 76 may be provided by a single integrated circuit and, in that case, the logic circuitry shown may be replaced by logic circuitry of the kind utilising clocked NOR and NAND gates.

In place of the shift register 4 and gate 5 which constitute the feedback path of the shift register 3, there may be provided two parallel-connected feedback paths each containing a shift register of half the storage capacity of the register 4 and an associated gate, these two feedback paths being arranged to handle alternate binary digits of the circulating data. This arrangement, in combination with a train of impulses having a repetition frequency of half that of the said clock pulses, simplifies the circuitry of the detectors 11 and 22 which are required to inspect successive subwords (i.e., four binary digits) of the data as it is being circulated in the store 1. The buffer store 18 and the digit store 35 may also be duplicated to handle alternate binary digits with consequential changes particularly to the code generator 54 and the coding circuit 58.

Although the detectors 11 and 22 have been considered as separate items responding to the circulating data (or absence of it), much of their circuitry may be common.

If the separation code is '1111', the separation code detector 11 may merely comprise a four input coincidence gate connected to four adjacent outputs of the shift register 4. The end of data detector 22 may be as shown in FIG. 6, the gate 120 supplying an output signal when a one of the last four storage locations in the register 4 is storing a digit having the value '1' (signifying that a sub-word is stored in those locations) while the preceding four storage locations have no such digit (signifying that no-sub-word is stored thereby).

It is to be understood that the present invention is not restricted in repertory diallers in which only a single pushbutton is pressed to determine the information that is to be signalled to line but may also be applied to telephone users' apparatus, for example a short code dialler, in which the information to be signalled is determined by manual operation of two or more selected pushbuttons, keys or other switches.

We claim:

1. A digital storage system for storing data in the form of a plurality of data words of variable length comprising a dynamic data store having a circulation loop round which the stored data words normally pass repeatedly as a single block of data without any gaps between words in the block, circuit means to add a data word to the end of the block of data circulating round the loop, erasure means temporarily to interrupt said loop to erase a data word stored by said store, and close-up means responsive to operation of the erasure means to leave a gap in the block of data circulating round the loop temporarily to produce a predetermined variation in the effective length of the loop for a period less than that in which said block of data passes round the loop during each of the succession of passes so as to reduce the gap during each such pass until the gap has closed up.

2. A digital storage system according to claim 1 wherein said close-up means comprises a loop extension, means to connect the loop extension into the loop at a particular point as the end of the data block passes that point and means to remove the loop extension from the loop when at least part of the gap is stored by the loop extension.

3. A digital storage system according to claim 1 wherein said data store comprises shift register means and a feedback path connected between the output and input ends of the shift register means.

4. A digital storage system according to claim 3 wherein said close-up means comprises further shift register means, circuit means to connect said further shift register means into the feedback path temporarily to extend the length of the loop and circuit means operable subsequent to operation of the last-mentioned circuit means to remove said further shift register means from the feedback path and thereby restore the loop to its normal length.

5. A digital storage system according to claim 3 wherein said close-up means comprises further shift register means, circuit means to connect said further shift register means into the feedback path as the end of the data block passes through the feedback path, and circuit means to remove said further shift register means from the feedback path when at least part of the gap is stored by the further shift register means.

6. Apparatus for use with a telephone instrument for supplying signals to line characteristic of a party to whom connection is required comprising shift register means, a feedback path connected between the output and input ends of the shift register means to form a circulating main data store for the storage of a plurality of data words which normally circulate in the store as a single block of data without any gap between words and each of which words include a digital address and digital information in respect of another party to whom connection may be required, a plurality of manually-operable calling means, address means to supply an associated digital address signal upon operation of any one of said calling means, a further data store, comparison means to compare the address of the signal supplied by the address means with the addresses of words circulating in the main data store, circuit means operable upon address identity being detected by said comparison means to write into the further store the digital information of the word circulating in the main data store having the appropriate address, signal generating means to supply electric signals for transmission to line in respect of the digital information stored by the further store, switch means, erasure means temporarily to interrupt the feedback path upon operation of the one of said calling means subsequent to operation of said switch means to erase from the main data store any word previously stored thereby having the address of the signal then supplied by the address means in response to operation of the appropriate calling means, and circuit means operable upon a word being erased by the last mentioned means to close up any resulting gap in the data block circulating in the main data store, the last mentioned means comprising further shift register means and circuit means selectively to connect said further shift register means in said feedback path to effect a temporary variation of the storage capacity of the main data store for a period less than that in which said block of data passes around the store so as to reduce the gap on each such pass.

7. Apparatus according to claim 6 wherein said signal generating means is an impulse generator which supplies trains of impulses to characterise the digital information stored by said further store.

8. Apparatus which is for use with a telephone system comprising shift register means, a feedback path connected between the output and input ends of the shift register means to form a circulating main data store for the storage of a plurality of data words which normally circulate in the store as a single block of data without any gap between words and each of which words include a digital address and digital information in respect of another party to whom connection may be required over the telephone system, a plurality of manually-operable calling means, address means to supply an associated digital address signal upon operation of any one of said calling means, a further data store, comparison means to compare the address of the signal supplied by the address means with the addresses of words circulating in the main data store, circuit means operable upon address identity being detected by said comparison means to write into the further store the digital information of the word circulating in the main data store having the appropriate address, circuit means to supply electric signals for transmission to line in respect of the digital information stored by the further store, recording means operable to enable a data word associated with one of said calling means to be written into the main data store, a plurality of manually operable data means, means operable subsequent to operation of the recording means to add to the end of the data block circulating in the main data store a word having an address determined by operation of the appropriate calling means and digital information determined by operation of a plurality of said data means, circuit means operable upon operation of one of said calling means subsequent to operation of said recording means and for the purpose of writing a new data word into the main data store to erase from the main data store any word previously stored thereby having the same address, and circuit means operable upon a word being erased by the last mentioned means to close up any resulting gap in the data block circulating in the main data store, the last mentioned means comprising further shift register means and circuit means selectively to connect said further shift register means in said feedback path to effect a temporary variation of the storage capacity of the main data store for a period less than that in which said block of data passes around the store so as to reduce the gap on each such pass.

9. A digital storage system for storing data in the form of a plurality of data words of variable length comprising a dynamic data store having a circulation loop around which the stored data words normally pass repeatedly as a single block of data without any gaps between words in the block, circuit means to add a data word to the end of the block of data circulating round the loop, erasure means temporarily to interrupt said loop to erase a data word stored by said store, and close-up means to close up the gap in said block of data resulting from operation of the erasure means, said close-up means comprising bistable means that is set to a predetermined state subsequent to operation of the erasure means, a shift register for storing a small number of digits that is less than the number of digits of a complete data word, first circuit means operable when the bistable means has been set to said predetermined state to connect the shift register into the circulation loop at a particular point as the end of the data block passes that point, second circuit means subsequently to remove the shift register from the circulation loop when part of the gap is stored thereby, and means responsive to the remaining gap having only a digital length equal to the storage capacity of the shift register to reset the bistable means so as to prevent further operation of the first circuit means, this situation occurring after the first and second circuit means have been operated a plurality of times at each of which the gap has been reduced.

* * * * *